US005731569A

United States Patent [19]

Crescenzo

[11] Patent Number: 5,731,569

[45] Date of Patent: Mar. 24, 1998

[54] MIRROR ATTACHMENT TO PREVENT THE FORMATION OF CONDENSATION

[76] Inventor: George Crescenzo, 50 Eureka Ave., Stratford, Conn. 06497

[21] Appl. No.: 567,675

[22] Filed: Dec. 5, 1995

[51] Int. Cl.[6] .............................. H05B 3/00; G02B 5/12; A47K 3/22

[52] U.S. Cl. .............................. 219/219; 359/514; 4/597

[58] Field of Search .............................. 219/202, 203, 219/219, 522, 541, 542, 543; 359/512, 513, 514; 4/597, 598

[56] References Cited

U.S. PATENT DOCUMENTS

| | | | |
|---|---|---|---|
| 2,617,701 | 11/1952 | Fennell | 312/227 |
| 2,815,433 | 12/1957 | Zumwalt | 219/219 |
| 3,530,275 | 9/1970 | Rust | 219/219 |
| 3,708,218 | 1/1973 | Smillie, III | 359/512 |
| 4,655,559 | 4/1987 | Odell | 359/512 |
| 4,665,304 | 5/1987 | Spencer | 219/219 |
| 4,733,468 | 3/1988 | Zadro | 359/512 |
| 4,933,533 | 6/1990 | Simpson | 219/219 |
| 4,988,847 | 1/1991 | Argos et al. | 392/363 |
| 5,063,283 | 11/1991 | Orazi | 219/218 |
| 5,149,942 | 9/1992 | Garrett | 219/219 |
| 5,302,809 | 4/1994 | Ghrassy | 219/219 |
| 5,347,106 | 9/1994 | Reiser et al. | 219/219 |
| 5,416,635 | 5/1995 | Christianson et al. | 359/512 |
| 5,616,265 | 4/1997 | Altman | 219/497 |

*Primary Examiner*—Teresa J. Walberg
*Assistant Examiner*—Sam Paik
*Attorney, Agent, or Firm*—Perman & Green, LLP

[57] ABSTRACT

A device for attachment to a mirror to prevent condensation on the mirror surface including: a pad element having at least one interior chamber and containing a heat retaining liquid such as a gel. Heating means such as an electrical heat element is located in the gel in the chamber of the pad element for heating the gel to a desired temperature; and the pad element is connected to the mirror to heat the mirror to prevent condensation from forming on the surface of the mirror. The device may also include heat sensor, a thermostat, and a timer.

18 Claims, 2 Drawing Sheets

MIRROR ATTACHMENT TO PREVENT THE FORMATION OF CONDENSATION

BACKGROUND OF THE INVENTION

1. Field of the Invention

The present invention relates to a device for attachment to a mirror for preventing condensation from forming on the mirror surface, and more particularly to an attachment for a mirror to distribute heat uniformly on the surface of its mirror.

2. Description of the Prior Art

Apparatus has been provided in the prior art to overcome the problem of condensation forming on glass surfaces, particularly in humid environments such as bathrooms and shower rooms.

One approach to the prevention of condensation is to heat the mirror by electric heating devices containing resistive elements. References directed to this type of device are as follows.

U.S. Pat. No. 5,347,106 issued Sep. 13, 1994 to Reiser et al. entitled FOG-RESISTANT MIRROR ASSEMBLY discloses a mirror assembly using a reflective coating as a heating element for preventing fog formations on a mirror exposed to a humid environment such as is found in a bathroom. The coating has a relatively high resistance and may be split into separate conductive elements with one or more scribe lines in order to control the length of the conductive path from inlet bus to outlet bus. The buses are made from an ultra thin foil tape which can be adhered to the reflective coating and which is solderable for securement of power lines thereto.

U.S. Pat. No. 5,302,809 issued Apr. 12, 1994 to Ghiassy entitled MIRROR DEFOGGER WITH ELONGATED FRAME MEMBER AND DOWNWARDLY EXTENDING HEATER SHEET discloses a resistive sheet electrical mirror heater for defogging a bathroom mirror. An elongated frame member rests along the top of the mirror and contains electrical circuitry. A planar heater sheet extends downwardly from and is supported by the frame member between the mirror and the wall. A power cord for connecting directly to a household outlet may extend from either end of the frame member.

U.S. Pat. No. 4,933,533 issued Jun. 12, 1990 to Simpson entitled DEMISTING MIRROR discloses a mirror for domestic use in the bathroom or kitchen having electric heating means in the form of a resistance heater having a positive temperature coefficient of resistance and being an elongated cable supported by a molded plastic member in direct contact with the rear surface of the mirror.

U.S. Pat. No. 4,665,304 issued May 12, 1987 to Spencer entitled ANTI-CONDENSATION MIRROR discloses a heating element for bathroom and similar mirrors that is formed as a laminate for placing behind a conventional mirror glass. The laminate has separate foil conductor patterns forming distribution and return conductors for the supply current, and a continuous conductor layer formed by a higher resistivity conducting paint or coating extending between the conductor patterns. Preferably the conductor patterns are formed as longitudinal bands and a continuous web of insulative substrate material which is then cut into lengths which are mounted on backing sheets of appropriate size and which carry buses to establish connection between the conductor bands and an electrical supply.

U.S. Pat. No. 3,530,275 issued Sep. 22, 1970 to Rust entitled CONDENSATION CONTROL FOR MIRRORS discloses a thermal sensitive switch that is mounted on the hot water supply pipe of a shower. When heated water of a predetermined minimum temperature flows through the pipe, the switch is closed and causes energization of a heating element mounted behind a nearby mirror thereby causing the mirror glass to heat to attempt to prevent condensation from forming on the outward surface of the mirror.

Devices and apparatus that remove condensation by directing heated air onto the mirror include the following references.

U.S. Pat. No. 5,063,283 issued Nov. 5, 1991 to Orazi entitled BATHROOM CABINET discloses a bathroom cabinet including a main mirror that is kept defogged by directing heated air thereagainst. The amount of air and the temperature that air is controlled according to the temperature and relative humidity in the room. A lighting assembly is also included in the cabinet.

U.S. Pat. No. 4,988,847 issued Jan. 29, 1991 to Argor et al. entitled ELECTRICALLY HEATED AIR BLOWER UNIT FOR DEFOGGING BATHROOM MIRRORS discloses a device for defogging a wall mounted bathroom mirror including an elongated housing adjustable suspended above and outwardly of the mirror by a pair of brackets. Ambient air drawn into the housing by a fan is filtered, heated by an electric heating element and discharged through an elongated air outlet on the housing toward the mirror. The air outlet is provided with a plurality of adjustable longitudinal louvers for selectively varying the heated air flow direction. Each louver is provided with an electric heating element for further heating the discharged air.

U.S. Pat. No. 2,815,422 issued Dec. 3, 1957 to Zumwalt entitled NON-FOGGING BATHROOM MIRROR discloses a heating mirror attachment structure containing a light bulb or a resistance element to heat the outer surface of the mirror.

U.S. Pat. No. 2,617,701 issued Nov. 11, 1995 to Fennell entitled ANTIFOGGING ATTACHMENT FOR BATHROOM MIRRORS discloses an attachment for use with the mirror of a bathroom cabinet to prevent moisture collecting on the mirror and thus avoid fogging or obscuring the surface of the mirror including a blower mounted in a housing at the top of the cabinet constructed for flowing air downwardly across the face of the cabinet door on a heater positioned in the outlet for the blower for blowing warm air across the face of the cabinet door to dry the moisture.

SUMMARY OF THE INVENTION

The problem of condensation on mirrors temporarily exposed to warm, humid air, as in bathrooms, is of long standing and has proved difficult to solve.

When a mirror is situated in a hot, high humidity environment such as a bathroom or kitchen, it is particularly susceptible to the formation of a mist or condensed water on the exposed surface. This is due to the condensing action of the cold mirror surface on the steam or water vapor in the vicinity of the mirror resulting in condensation on the front surface of the mirror.

There have been examples of heated or defogging mirrors in the prior art, but none of the prior art approaches has been commercially successful because of their performance shortcomings. If a defogging mirror is to solve the problem facing the user in the bathroom in normal operating conditions, it must heat up quickly from a relatively cold condition, and it should not use an excessive amount of power. In addition, it is important that the heat be distributed evenly and uniformly over the surface of the mirror to eliminate the condensation from the entire mirror surface at the same time. Prior art devices using heated wires or hot air directed onto the mirror do not remove the condensation uniformly, and do not retain the heat over a period of time.

An object of the present invention is to provide a device for attaching to a mirror to prevent condensation from forming on the mirror.

Another object of the present invention to provide a mirror attachment for providing heat uniformly over the surface of the mirror to prevent condensation.

Still another object of the present invention is to provide a mirror attachment to prevent condensation that may be simply affixed to and removed from the mirror.

A further object of the present invention is to provide a mirror attachment to prevent condensation that may be simply adjusted in length.

A still further object of the present invention is to provide a mirror attachment to prevent condensation that includes a receptacle containing a homogeneous material for distributing heat uniformly over the mirror surface.

Still another object of the present invention is to provide a mirror attachment including a pad containing gel material which, when heated, retains the heat uniformly over a period of time.

BRIEF DESCRIPTION OF THE DRAWINGS

The above set forth and other features of the invention are made more apparent in the ensuing Detailed Description of the Invention when read in conjunction with the attached drawings, wherein.

DESCRIPTION OF THE PREFERRED EMBODIMENTS

Figure 1:
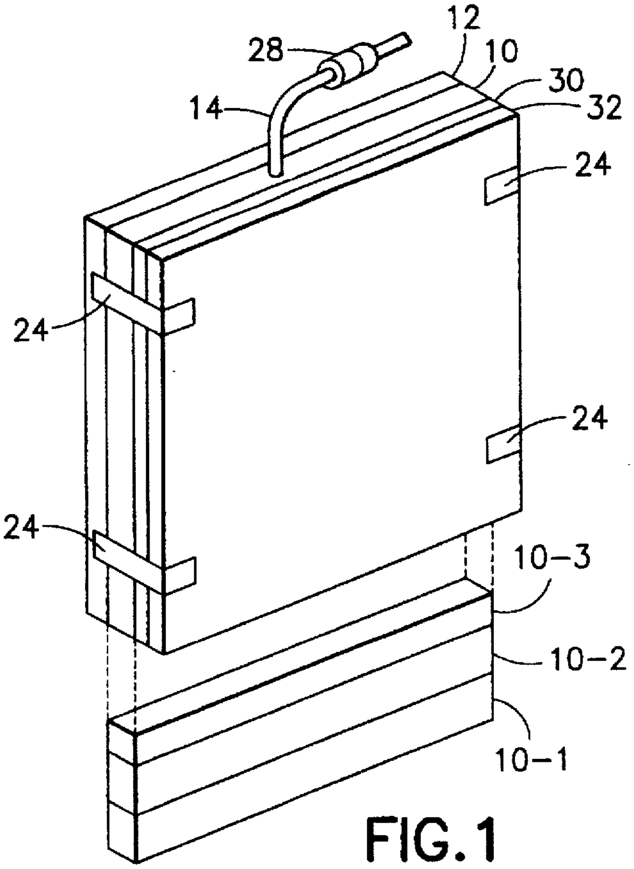
FIG. 1 is a perspective view of an embodiment of a mirror attachment device according to the principles of the present invention.

Referring to FIG. 1, a perspective view of a device for attachment to a mirror to prevent condensation on the surface of the mirror. The device 10, which will be referred to as a pad or more specifically a gel pad is shown attached to a mirror structure 12, which may be a wall mirror, a mirror that is incorporated in a medicine cabinet for a bathroom or the like. Pad 10 is affixed to the non-reflective side of mirror 12, such as by adhesive, or mechanically by hooks, screws or by clips 24 on each side of pad 10 or straps extending across the back of pad 10. In FIG. 1 the pad 10 may be composed of a single chamber or a plurality of separate interconnected chambers 10-1, 10-2, 10-3 etc., such that the pad 10 may be manufactured having a particular length, and the user can tear-off a number of chambers to achieve a desired length to fit the mirror 12. It should be understood that pad 10 may also be fabricated as one large chamber rather than having a plurality of chambers or be fabricated as a combination of one large pad with a plurality of smaller detachable chambers at one end. Pad 10 further includes an electric heating element detachably connected by an electrical wire 14 and a connector 28 to a source of electricity such as an electrical outlet or socket found in most bathrooms. The source of electricity may also be a standard or rechargeable battery.

In addition to the basic components of gel filled pad 10 and the heating elements therefor, the embodiment of the invention may also include a sheet of heat insulating material 30 such as polystyrene disposed at the rear of pad 10 and a rigid back support 32 composed of metal, plastic or the like.

Figure 2:
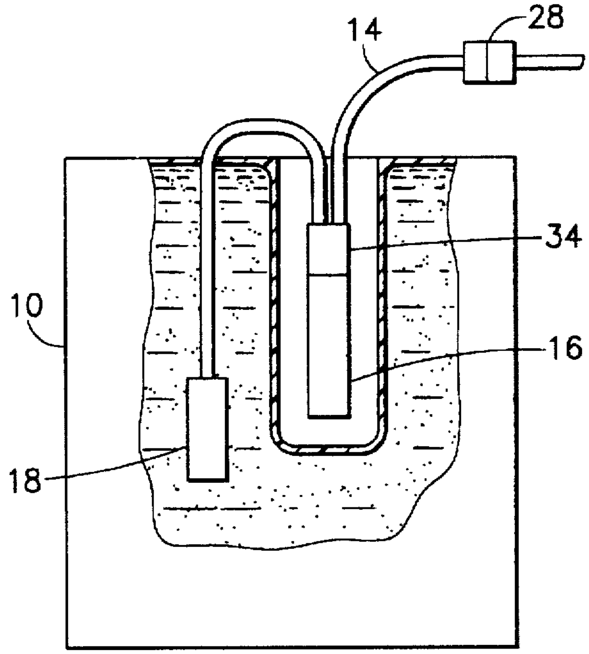
FIG. 2 is a front plan view of an embodiment of a mirror attachment device including an electrical cord, a heating element and a heat sensor therefor.

Referring to FIG. 2, a schematic plan view of pad 10 shows a heating element or electrode 16 disposed within pad 10 and connected to electrical wire 14. Heating element 16 may also be connected to a heat sensor 18. Heating element 16 and heat sensor 18 are arranged so that they may be easily removed from pad 10 for service or replacement.

Pad 10 may be constructed of plastic or rubber material having good heat insulations properties, with the exception of the front surface of pad 10 that contacts the back of mirror 12, wherein such front surface is composed of heat conductive material so that heat is efficiently transmitted from pad 10 to mirror 12 and that heat is retained by the gel over a period of time.

Pad 10 is filled with a fluid material, preferably a gel, which, in response to heating element 16, increases in temperature evenly and provides uniform heat over the back of mirror 12. Heat is therefore transferred uniformly from pad 10 to mirror 12 and that heat is retained by the gel over a period of time.

The resulting heated mirror 12 is raised to a temperature level selected to prevent condensation from forming on the reflective surface thereof.

The gel contained within pad 10 is selected for its ability to retain heat. A polyacrylate/polyalcohol gel that retains heat is one example, however other gels, and even liquid such as water may be employed depending on the application and operating environment.

As previously stated, pad 10 is typically fabricated from durable, flexible plastic material with a thickness preferably no greater than 0.25 inches.

The size dimensions of the pad may be as desired but a typical unit would be seven inches in width and forty-eight inches in length. If the pad 10 is fabricated to have separate chambers, they may be made four inches in length so that they may be removed to provide paid lengths of forty-four, forty, thirty-six inches and so on.

Figure 4:
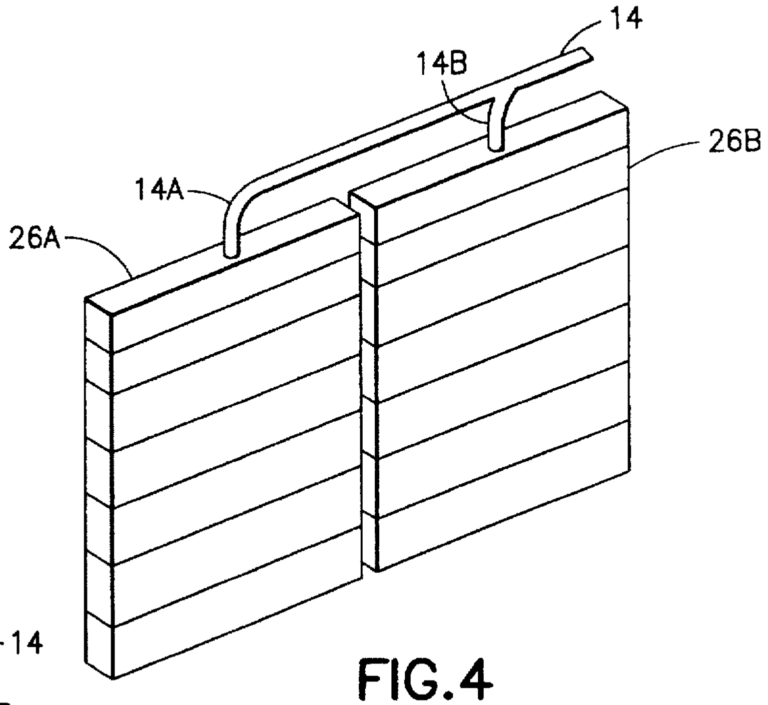
FIG. 4 is an illustration of a mirror attachment device including two pads.

It is also contemplated by the present invention that two or more pads may be mounted on the mirror side by side to provide selectability of width, as shown by pads 26A and 26B in FIG. 4. Pads 26A and 26B may be connected by a "Y" connection 14A, 14B and wire 14 to single power source as illustrated.

Figure 3:
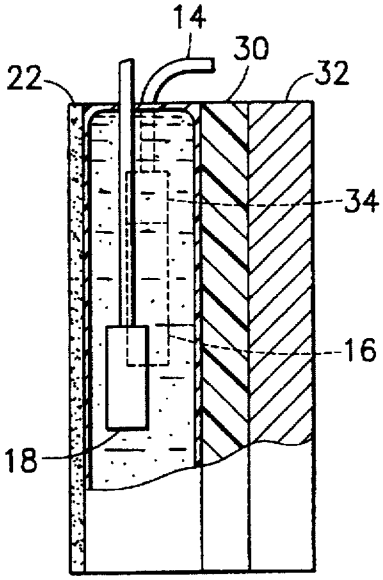
FIG. 3 is a side view of an embodiment of a mirror attachment according to the principles of the present invention.

Referring to FIG. 3, a side view of an embodiment of a pad structure 10 is illustrated including electrical cord 14, heating element 16, heat sensor 18 and further showing a layer of adhesive material 22 used to affix pad 10 to a mirror instead of employing hooks, straps or clips.

Figure 5:
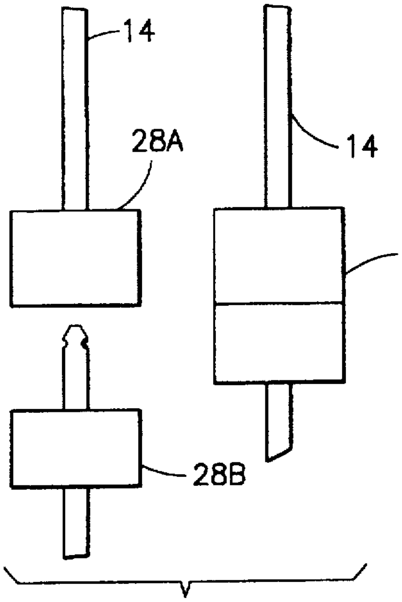
FIGS. 5 and 6 are detailed views of embodiments of the electric cords, sensors and heating elements used in the present invention.

Referring to FIG. 5, a detailed view of the wire 14 and connector 28, illustrating that the wire 14 may be detached by means of connector 28 including a male-female interconnect 28A and 28B.

In FIGS. 2 and 3, an illustration is provided of a thermostatic heat element 16 including a thermostat 34 connected to wire 14 and to heat sensor 18 connected to thermostat 34. One skilled in the art will know that thermostat 34 is responsive to the temperature sensed by heat sensor 18, and if the temperature is below a selected temperature setting, will connect electrical power from wire 14 to heating element 16 to raise the temperature of the gel pad 10 to the selected temperature.

Figure 6:
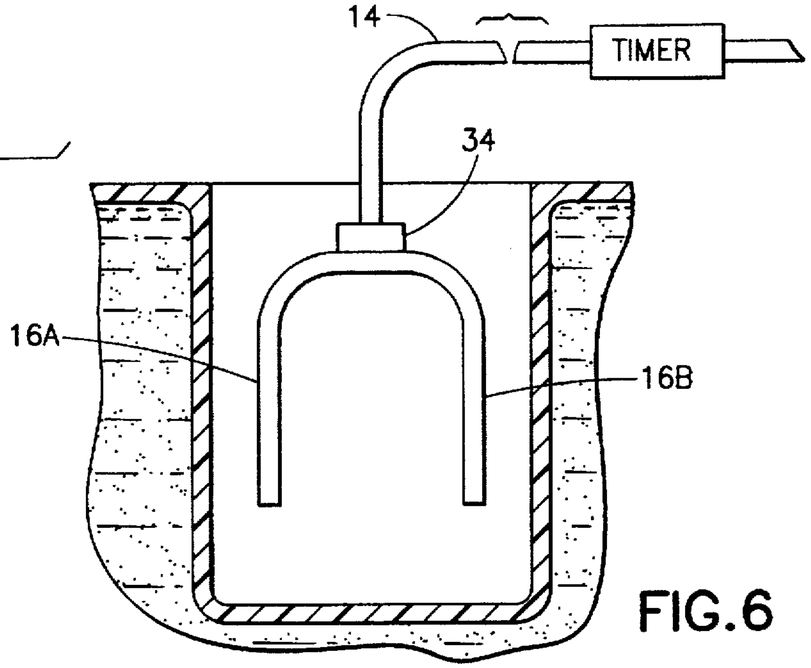

FIG. 6 illustrates another version of heat element 16 configured in a horseshoe shape with two elements 16A and 16B for more uniform and efficient heating of, and heat distribution in the gel in gel pad 10.

An advantage of the gel pad and electrical connection therefor is that an electrical timer 36 can be incorporated into the electrical connection to automatically turn the power to the gel pad on and off.

What has been described is an attachment for mirrors that eliminates condensation on mirror surfaces. The attachment includes a gel pad that can be adapted to fit all manufactured mirrors as well as custom sizes. The gel pads can be easily installed in the horizontal or vertical direction to fit the mirror dimensions. Simple push-in sockets or plug-in sockets eliminate the width problem because more than one pad can be hooked together to each other. Detachable chambers on the pad eliminates length problems, and sensors are provided to control temperature. A timer switch connected to the thermostats can be used to control on and off power. If more than one gel pad is required, the power line can also have more than one hookup.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A device for attachment to a mirror to prevent condensation on the mirror surface comprising:

a pad element having at least one interior chamber;

a heat retaining gel disposed in said interior chamber of said pad element;

heating means disposed proximate to said gel in said chamber of said pad element for heating said gel to a desired temperature; and means for connecting said element to a mirror to heat the mirror to prevent condensation from forming on the surface of the mirror.

2. A device for attachment to a mirror according to claim 1 wherein said gel is composed of a polyacrylate material.

3. A device for attachment to a mirror according to claim 1 wherein said gel is composed of a polyalcohol material.

4. A device for attachment to a mirror according to claim 1 wherein said heating means includes an electrical heating element disposed in said chamber in thermal contact with said gel, and an electrical connector for connecting said heating element to a source of electrical power.

5. A device for attachment to a mirror according to claim 4 wherein said heating means further includes a heat sensing device disposed in, and in thermal contact with said gel to provide a signal representative of the temperature of said gel, and a thermostat control device connected to said heating means, said heat sensing means and said electrical connector wherein said thermostat controls the electrical power to said heating element in response to said signal from said heat sensing device.

6. A device for attachment to a mirror according to claim 5 wherein said pad element includes a plurality of interior chambers that may be selectively disconnected from each other.

7. A device for attachment to a mirror according to claim 5 wherein said pad element includes a chamber composed of a flexible material, wherein said attachment further includes a rear member composed of heat insulating material, and wherein the front portion of said pad element is heat conductive.

8. A device for attachment to a mirror according to claim 5 wherein said heating means includes at least one electrically resistive conductor.

9. A device for attachment to a mirror according to claim 8 wherein said heating means is a horseshoe-shaped element including two resistive heating elements.

10. A device for attachment to a mirror according to claim 5 wherein said electrical connector includes a detachable male-female electrical interconnecting device.

11. A mirror assembly combining a mirror and a device for attachment to a mirror to prevent condensation on the mirror surface comprising:

a mirror having a reflective front surface and a back surface;

a pad element having at least one interior chamber connected to said back surface of said mirror;

a heat retaining gel disposed in said interior chamber of said pad element;

heating means disposed proximate said gel in said chamber of said pad element for heating said gel to a desired temperature; and means for connecting said pad element to said mirror to heat the mirror to prevent condensation from forming on the surface of the mirror.

12. A mirror assembly according to claim 11 wherein said heating means includes an electrical heating element disposed in said chamber in thermal contact with said gel, and an electrical connector for connecting said heating element to a source of electrical power.

13. A mirror assembly according to claim 12 wherein said heating means further includes a heat sensing device disposed in, and in thermal contact with said gel to provide a signal representative of the temperature of said gel, and a thermostat control device connected to said heating means, said heat sensing means and said electrical connector wherein said thermostat controls the electrical power to said heating element in response to said signal from said heat sensing device.

14. A mirror assembly according to claim 13 wherein said pad element includes a plurality of interior chambers that may be selectively disconnected from each other.

15. A mirror assembly according to claim 13 wherein said pad element includes a chamber composed of a flexible material, wherein said attachment further includes a rear member composed of heat insulating material, and wherein the front portion of said pad element is heat conductive.

16. A mirror assembly according to claim 13 wherein said heating means includes at least one electrically resistive conductor.

17. A mirror assembly according to claim 16 wherein said heating means is a horseshoe-shaped element including two resistive heating elements.

18. A mirror assembly for attachment to a mirror according to claim 13 wherein said electrical connector includes a detachable male-female electrical interconnecting device.

* * * * *